United States Patent
Ahn

(10) Patent No.: US 7,072,333 B2
(45) Date of Patent: Jul. 4, 2006

(54) ACCESS DEVICE FOR SUPPORTING VARIABLE DATA LAYER

(75) Inventor: Jeong Jun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 877 days.

(21) Appl. No.: 09/898,153

(22) Filed: Jul. 2, 2001

(65) Prior Publication Data
US 2002/0091862 A1 Jul. 11, 2002

(30) Foreign Application Priority Data
Dec. 21, 2000 (KR) .............................. 2000-79754

(51) Int. Cl.
H04L 12/66 (2006.01)
(52) U.S. Cl. .................... 370/353; 370/395.6; 370/401
(58) Field of Classification Search ................ 370/352, 370/353, 356, 395.1, 395.6, 395.61, 401, 370/402
See application file for complete search history.

(56) References Cited
U.S. PATENT DOCUMENTS
5,970,069 A * 10/1999 Kumar et al. ............... 370/402

6,345,054 B1 * 2/2002 Sasaki ......................... 370/465
6,542,500 B1 * 4/2003 Gerszberg et al. .......... 370/354

* cited by examiner

Primary Examiner—Chau Nguyen
Assistant Examiner—Ian N. Moore
(74) Attorney, Agent, or Firm—Lee, Hong, Degerman, Kang & Schmadeka

(57) ABSTRACT

The present invention discloses an access device for supporting a variable data layer including: a user access processing module unit for receiving and processing an input command of a user, providing externally-received voice data to the user, and processing access to a local area network; a central control processing module unit for processing the voice data processed in or inputted to the user access processing module unit, and controlling processing units of the respective modules; and a wide area network access processing module unit for receiving data from the central control processing module unit, and performing a matching operation for a physical layer access. As a result, the access device supports the variable data layer, minimizes hardware variations due to variations of a physical layer access medium, and utilizes system hardware according to environmental variations of the physical access unit.

14 Claims, 3 Drawing Sheets

ACCESS DEVICE FOR SUPPORTING VARIABLE DATA LAYER

CROSS REFERENCE TO RELATED ART

This application claims the benefit of Korean Patent Application No. 2000-79754, filed on Dec. 21, 2000, which is hereby incorporated by reference in its entirety.

BACKGROUND OF THE INVENTION

1. Field of the Invention

The present invention relates to an access device for supporting a variable data layer, and in particular, to an improved access device for supporting a variable data layer which can minimize variations of system hardware constitution due to access variations of a physical layer unit.

2. Discussion of the Related Art

FIG. 1 is a block diagram illustrating a conventional access device for supporting 10 Base-T access of a physical layer. Referring to FIG. 1, the access device for supporting the 10 Base-T access includes a user access processing module unit 12 having an analog access processing unit 10 and a digital access processing unit 11; a central control processing module unit 16 having a time division multiplexing (TDM) switching unit 13, a voice processing unit 14 and a processor module unit 15; and a local area network (LAN) access processing module unit 18 having a LAN access processing unit 17. In the conventional access device, when the user inputs a command, the user access processing module unit 12 processes the command of the user and transmits the processing result to the central control processing module unit 16. The central control processing module unit 16 converts the command of the user into data usable in an external layer. The LAN access processing module unit 18 externally transmits the converted data from the central control processing module unit 16.

The operation of the conventional access device will now be explained. When the user inputs a specific command, if the inputted command is an analog data, such as a telephone or fax, the user access processing module unit 12 enables the analog access processing unit 10 to process the data. If a private exchange externally transmitting/receiving a digital data is engaged, the user access processing module unit 12 enables the digital access processing unit 11 to process the data. The data processed in the analog access processing unit 10 is transmitted to the TDM switching unit 13 through TDM bus A. The data processed in the digital access processing unit 11 is transmitted to the TDM switching unit 13 through TDM bus B.

The TDM switching unit 13 performs a switching operation between TDM buses A and B, and transmits the processed data to the voice processing unit 14 through TDM bus C. The voice processing unit 14 compresses the received voice data according to a compression method provided by a CPU 24 of the processor module unit 15, and transmits the compressed voice data to the CPU 24 of the processor module unit 15 through a host processor interface (HPI). The HPI bus acts as address/data buses for transmitting/receiving data to/from a processor of the processor module unit 15 and an auxiliary processor of the voice processing unit 14, and related control signals.

In order to transmit the compressed voice data to a corresponding system through the LAN access processing unit 17, the CPU 24 of the processor module unit 15 converts voice compression information and destination information into internet protocol (IP) frames, and transmits the frames to the LAN access processing unit 17. The LAN access processing unit 17 transmits the IP packet from the processor module unit 15 to an external IP network, such as the Internet.

When the packet is received from the external IP network, the LAN access processing unit 17 receives the IP packet and transmits it to the CPU 24 of the processor module unit 15. The processor module unit 15 extracts the IP frame from the IP packet, and extracts compressed voice data, voice compression information and destination information from the extracted IP frame. Then, the processor module unit 15 transmits the compressed voice data to the voice processing unit 14 through the HPI bus, transmits control information for restoring the voice compression data according to the extracted voice compression information, and transmits path control information of the TDM switching unit 13 according to the destination address.

The voice processing unit 14 restores the received voice data according to a restoring method provided by the CPU 24, and transmits the restored data to the TDM switching unit 13 through TDM bus C. The TDM switching unit 13 transmits the restored voice data from the voice processing unit 14 to the analog/digital access processing unit 10 or 11 of the user access processing module unit 12 through TDM bus A or B, maintaining the switching path transmitted from the CPU 24.

The aforementioned process will now be described in short in view of software processing. The access device receives a reset signal from a peripheral interface logic in the processor module unit 15 after receiving power, determines an operation state of the CPU, forms an initial setup for the operation of the CPU from a boot ROM memory, and downloads a program programmed by software operation from an application RAM region. The respective access processing units 10 or 11 of the user access processing module unit are initialized for operation. In addition, a switching path is set up for the TDM switching unit 13. A voice processing method selected with the corresponding system through the LAN access processing unit is designated in the voice processing unit 14, so that the voice processing unit 14 can compress the voice data received through the TDM buses and restore the compressed voice data received through the HPI bus.

As described above, the processor module unit 15 sets up the basic environment where the system can be operated as the access device. After the initial setup process, the CPU of the processor module unit 15 periodically tests and processes the respective processing units, transmits the voice compression data received through the HPI interface to the LAN access unit in the form of an IP packet, decomposes the IP packet received through the LAN access unit to extract the compression voice data, and transmits the extracted data to the voice processing unit through the HPI bus. The voice processing unit restores the compressed voice data.

The general access device supports a specific data layer of a specific physical layer. In order to support access of another or a different physical layer, the access device requires a special external system. For example, the access device for supporting the 10 Base-T which is a transmission path standard of the LAN where the physical layer is standardized as IEEE 802.3 cannot directly access an x-type digital subscriber line (xDSL) network.

FIG. 2 shows a structure for accessing the xDSL network by using the conventional access device for supporting the 10 Base-T. As illustrated in FIG. 2, the conventional access device for supporting the 10 Base-T cannot access the xDSL network. In order to access the xDSL network, the access device should use an xDSL modem, or remove the 10-Base T, receive a service function of an access device and use the access device accessing the xDSL.

As described above, the conventional access device accesses in an IP environment and supports a specific physical layer access unit. However, according to technical developments of the xDSL, the conventional access device requires a special external system or a new system to access the xDSL network. In addition, applicability of the hardware is reduced.

SUMMARY OF THE INVENTION

Accordingly, an object of the present invention is to provide an access device for supporting a variable data layer by using a wide area network access processing module unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above-described object of the present invention, there is provided an access device for supporting a variable data layer including: a user access processing module unit having analog/digital access processing units for providing input/output services to the user, and having a local area network access processing unit; a central control processing module unit having a time division multiplexing switching unit for transmitting the voice data from the user access processing module unit to the voice processing unit, or the data from the voice processing unit to the user access processing module unit, and the voice processing unit for compressing the voice data from the time division multiplexing switching unit according to a method defined in a processor module unit, and compressing/restoring the data from the processor module unit according to a defined restoring method, and the processor module unit for controlling processing units of the module units; and a wide area network access processing module unit having a frame conversion processing unit for converting the data from the central control processing module unit to a frame which can support a physical layer access, or a data type which can be processed in the processor module unit of the central control processing module unit, and a physical access unit for performing a physical medium access.

In one aspect of the present invention, the user access processing module unit includes: an analog access processing unit for satisfying the user's demand for processing an analog data such as a telephone and fax; a digital access processing unit for satisfying the user's demand using a private exchange for processing a digital data; and a local area network access processing unit for externally transmitting or receiving 10 Base-T physical layer data.

In another aspect of the present invention, the central control processing module unit includes: a time division multiplexing switching unit for switching TDM buses, the data inputted by the user and processed in the user access processing module unit being transmitted through the TDM buses; a voice processing unit for compressing an externally-transmitted voice signal and restoring an externally-received voice signal according to a method defined in a CPU of a processor module unit; and the processor module unit having the CPU for initializing sub processing units of the processing module units, monitoring the status thereof, converting 10 Base-T physical layer data into an IP frame in transmission, extracting a voice data from the IP frame in reception, converting xDSL physical layer data into a frame supportable in a wide area network in transmission, and removing an overhead data from the received data in reception, a peripheral I/F logic for performing interface of the CPU, CPU related memory units, and a PLD/PGA logic for performing interface with the wide area network access processing module unit through UTOPIA bus.

In still another aspect of the present invention, the wide area network access processing module unit includes: a frame conversion processing unit having a framer unit for converting the data received from the central control processing module unit to an xDSL physical layer through UTOPIA bus into a frame usable in the physical layer, an encoding unit for converting the frame into a signal usable in the physical layer, a decoding unit for converting the signal from a physical access unit into a signal usable in the system, and a deframer unit for converting the data from the decoding unit into a frame type through UTOPIA bus to be processed in the processor module unit of the central control processing module unit; and the physical access unit for supporting a physical access medium.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

A preferred embodiment of the present invention will now be described with reference to the accompanying drawings. In the following description, reference is made to the accompanying drawings which form a part hereof and which illustrate the preferred embodiment of the present invention. It is understood that other embodiments may be utilized and structural and operational changes may be made without departing from the scope of the present invention.

Figure 1:
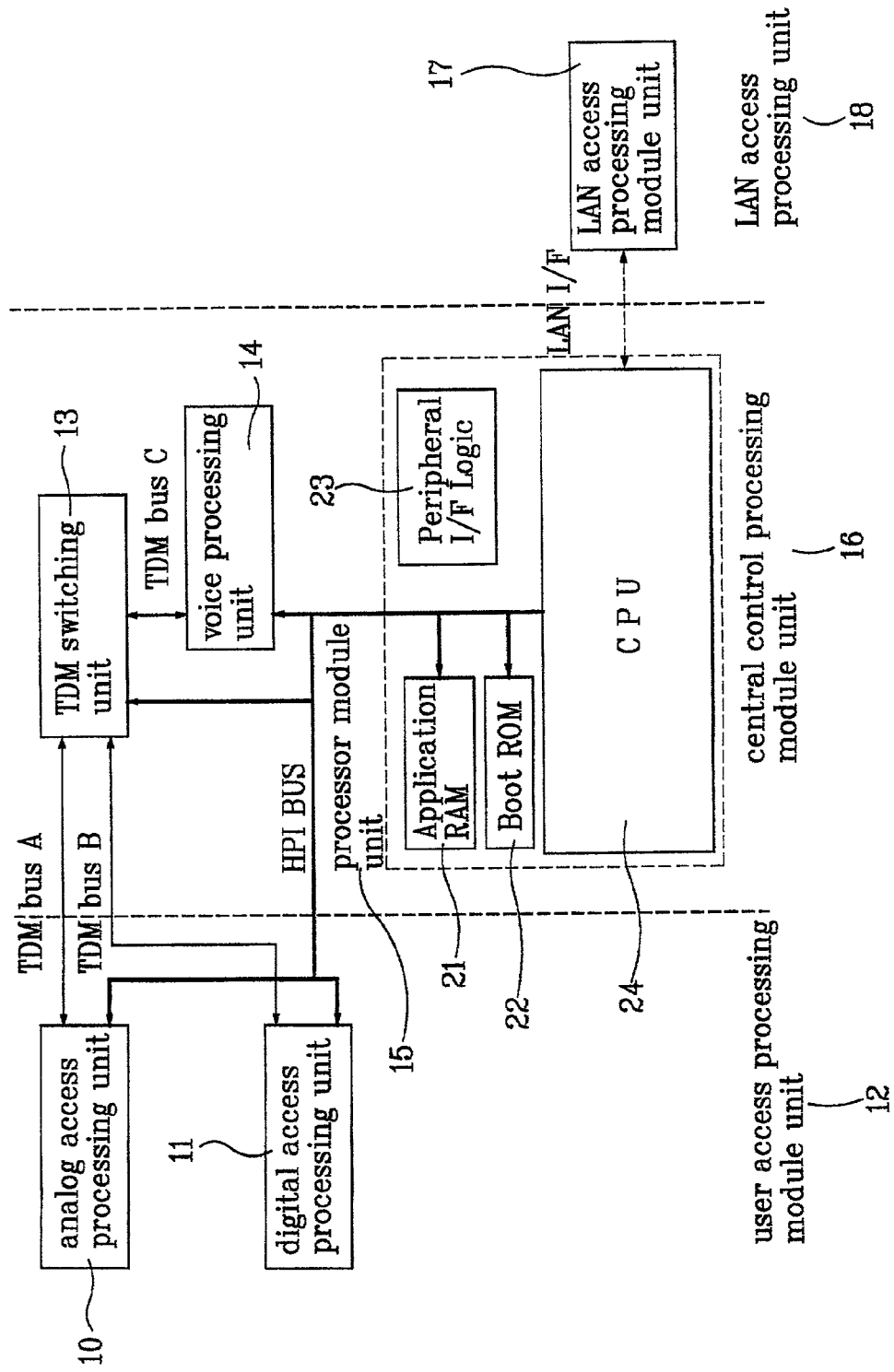
FIG. 1 is a block diagram illustrating a conventional access device for supporting 10 Base-T access of a physical layer.
Figure 2:
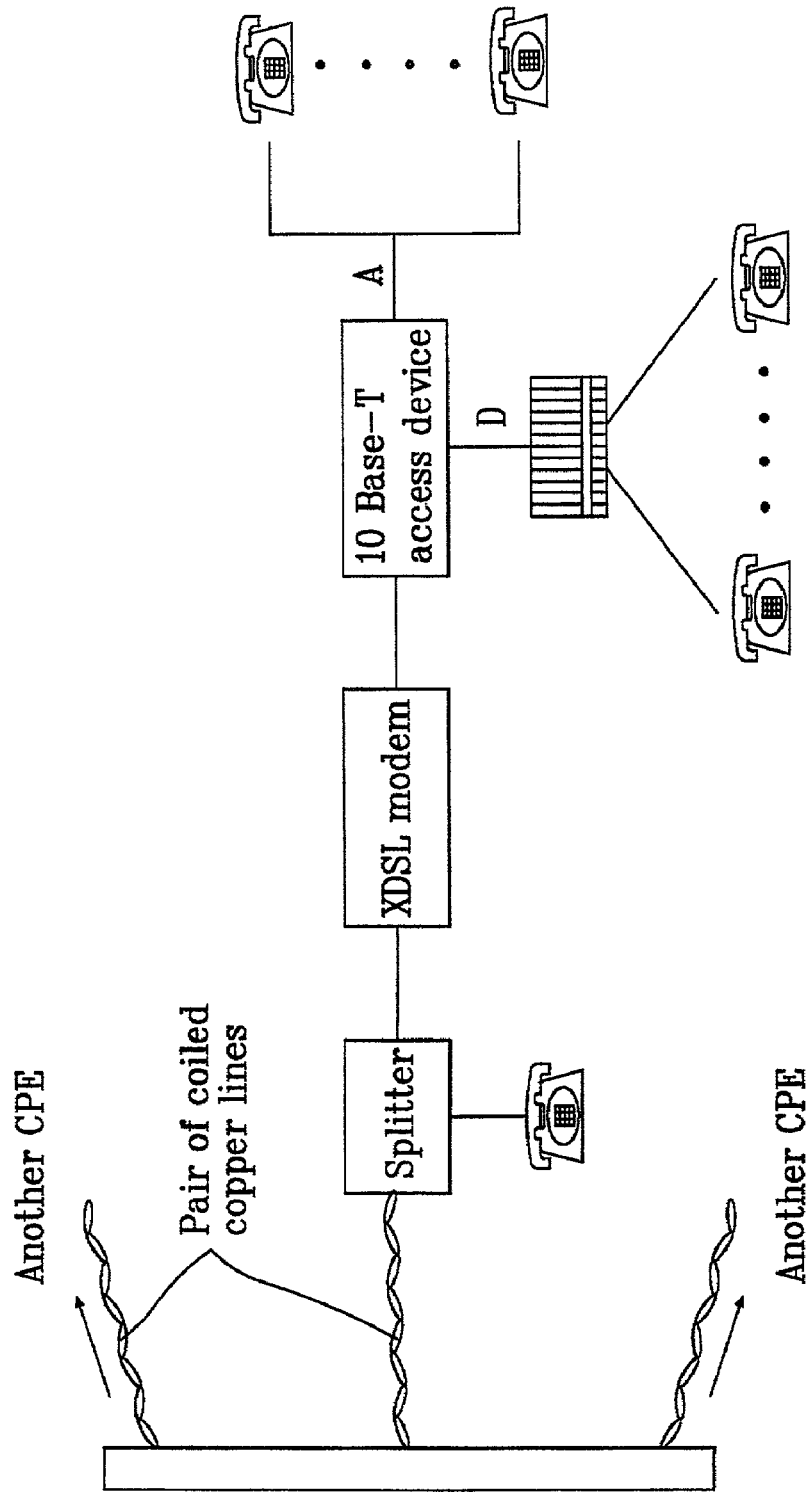
FIG. 2 shows a schematic structure for accessing xDSL network by using the conventional access device for supporting the 10 Base-T.
Figure 3:
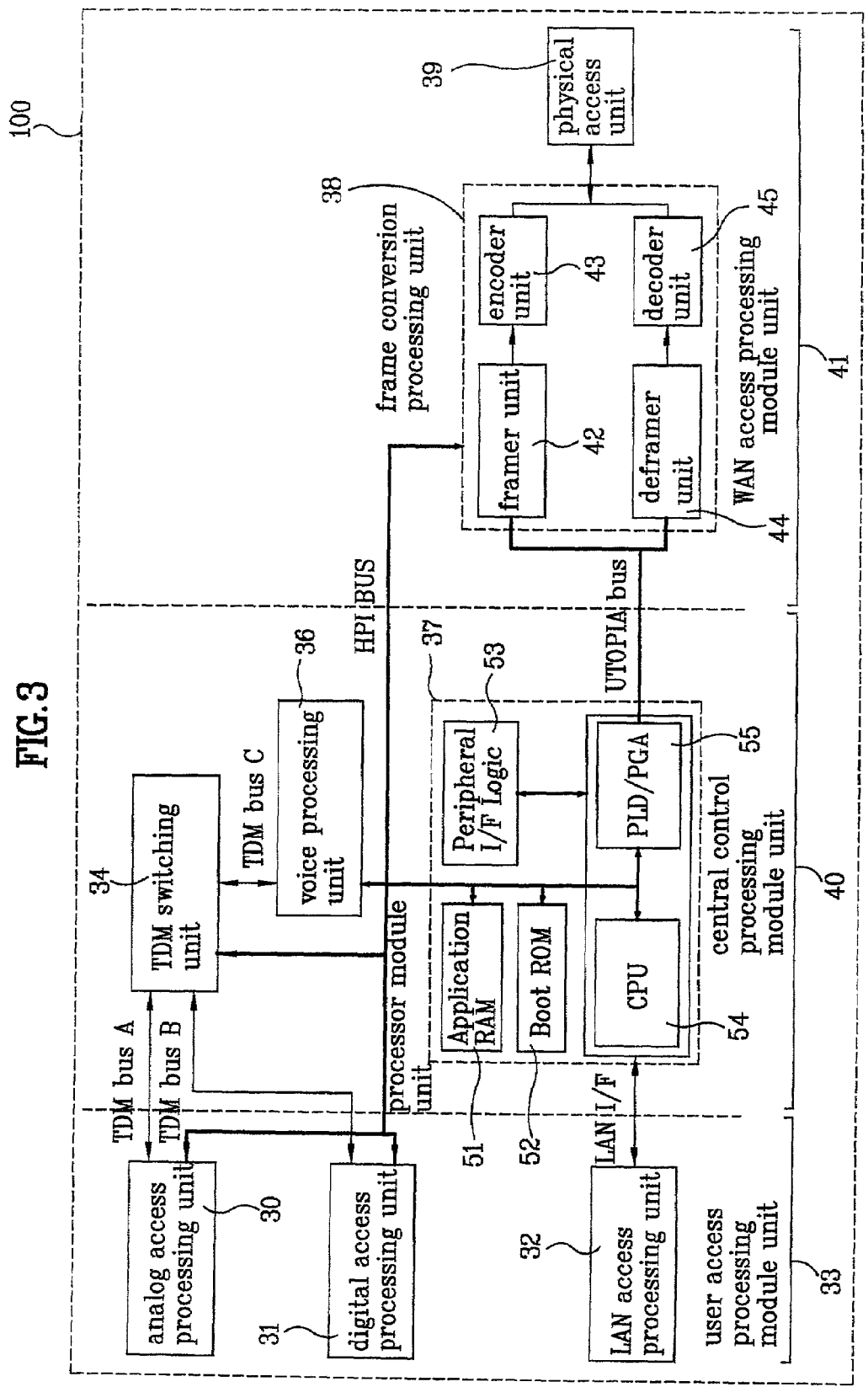
FIG. 3 is a block diagram illustrating an access device for supporting a variable data layer in accordance with a preferred embodiment of the present invention.

FIG. 3 is a structure diagram illustrating the access device for supporting the variable data layer in accordance with the preferred embodiment of the present invention. Referring to FIG. 3, the access device 100 includes a user access processing module unit 33, a central control processing module unit 40 and a WAN (Wide Area Network) access processing module unit 41.

According to the preferred embodiment, the user access processing module unit 33 includes an analog access processing unit 30 (preferably an A/D converter or codec), a digital access processing unit 31 and a LAN access processing unit 32. The central control processing module unit 40 includes a TDM switching unit 34, a voice processing unit 36 and a processor module unit 37. The WAN access processing module unit 41 includes a frame conversion processing unit 38 and a physical access unit 39, such as DB 25, RJ-48 connectors, etc.

The analog access processing unit 30 of the user access processing module unit 33 processes data from an analog system, such as telephone and fax. The digital access processing unit 31 processes data from a digital system, such as a digital private exchange or other suitable system known to one of ordinary skill in the art, through T1 or E1 line.

The TDM switching unit 34 of the central control processing unit 40 performs a switching operation between the TDM buses under the control of a CPU 54 of the processor module unit 37. The voice processing unit 36 compresses the externally-transmitted voice data and restores the externally-received compressed voice data according to a compression/restoring method defined between the CPU 54 of the processor module unit 37 and the corresponding system. For example, the voice processing unit 36 compresses the 64 kbps data to either the 5.6 kbps or the 6.3 kpbs data preferably using the G.723.1 standard protocol or other suitable algorithm known to one of ordinary skill in the art.

The CPU 54 of the processor module unit 37 forms the compressed voice data received through the HPI bus in the form of an IP packet according to compression algorithm residing in the memory region. In addition, the processor module unit 37 extracts the compressed voice data from the IP packet received through the LAN access processing unit, disassembles the IP packet into ATM (Asynchronous Transfer Mode) cells according to variations of the program, or extracts the IP packet by combining the ATM cells. When the processor module unit 37 includes a PLD/PGA logic 55 for interfacing between the HPI bus and the UTOPIA bus (which is described below), the frame conversion processing unit 38 of the WAN access processing module unit 41 transmits or receives the ATM cells. In addition, the CPU 54 controls the status of sub processing units of the module units. A peripheral I/F logic 53 of the processor module unit 37 defines the initial operation of the CPU, or notifies the operation state of the system to the user according to the management of the CPU in each module unit.

ATM is a network protocol that has grown out of the need for a worldwide standard to allow interoperability of information, regardless of the end-system or type of information. ATM is a method of communication which can be used as the basis for both LAN and WAN interconnect. When information needs to be communicated, the sender requests a path through the network for a connection to the destination. When setting up this connection, the sender specifies the speed, type and other features of the call.

UTOPIA (Universal Test and Operations Physical Interface for ATM) is a standard for data transmission/reception between the physical layer and higher layer. UTOPIA is a high speed point-to-point parallel bus. UTOPIA is used in ATM applications. The UTOPIA bus is a standard defined by the ATM forum for moving data between the physical and ATM layers in the ATM protocol stack. The physical layer interfaces directly to the network media (i.e., twisted pair, optical fiber, etc.) and also handles transmission convergence (e.g., extracting the ATM cells from the transport coding scheme). The ATM layer processes the cell headers and directs routing.

The WAN access processing module unit 41 includes a frame conversion processing unit 38 having a framer unit 42 for converting the data received from the central control processing module unit 40 to an xDSL physical layer through the UTOPIA bus into a frame usable in the physical layer, an encoding unit 43 for converting the frame into a signal usable in the physical layer, a decoding unit 45 for converting the signal received from a physical access unit 39 into a signal usable in the access device 100, and a deframer unit 44 for converting the data from the decoding unit 45 into a frame type through UTOPIA bus to be processed in the processor module unit of the central control processing module unit 40; and the physical access unit 39 for supporting a physical access medium according to variations of a physical access medium.

The 10 Base-T support operation and the XDSL interface support operation of the access device for supporting the variable data layer will now be explained, respectively. First, the 10 Base-T support operation of the access device will now be described.

When the input/output data of the user access processing module unit 33 is an analog data, such as a telephone or fax, the analog access processing unit 30 processes the data. Alternatively, the data is a digital data, such as digital trunk access of the private exchange, the digital access processing unit 31 processes the data. Depending on the type of data, the processed data is transmitted to the TDM switching unit 34 through the TDM bus A or B.

The TDM switching unit 34 transmits the data received through the TDM bus A or B to the voice processing unit 36 through the TDM bus C according to an internal switching operation. The voice processing unit 36 compresses the voice data received through the TDM switching unit 34 according to a compression method defined in the CPU 54 of the processor module unit 37, and transmits the compressed voice data to the CPU 54 of the processor module unit 37 through the HPI bus. The CPU 54 converts the voice compression data, compression method and destination address into internet protocol (IP) frames to be transmitted to an external IP network, such as the Internet, through the LAN access processing unit 32, and transmits the frames to the LAN access processing unit 32. The LAN access processing unit 32 transmits the packet received from the processor module unit 37 to the external IP network.

When the IP packet is inputted from the external IP network through the LAN access processing unit 32, the LAN access processing unit 32 transmits the received IP packet to the CPU 54 of the processor module unit 37. The CPU 54 extracts voice data from the received IP packet, transmits the extracted data to the voice processing unit 36 through the HPI bus, designates a different restoring method in the voice processing unit 36, and sets up a path of the TDM switching unit 34 according to a destination of the compressed voice data. The voice processing unit 36 restores the voice compression data received through the HPI bus according to the restoring method designated by the CPU 54 of the processor module unit 37, and transmits the restored data to the TDM switching unit 34 through the TDM bus C. The TDM switching unit 34 transmits the restored data to the analog/digital access processing unit 30, 31 of the user access processing module unit 33 according to a switching path designated by the CPU 54, so that the user can receive a voice service.

The xDSL interface support operation of the access device will now be described. The 10 Base-T support operation and the xDSL interface support operation are performed in the same manner until the voice data is compressed into the IP packet or the voice compression data extracted from the IP packet is restored in the analog/digital access processing units 30 and 31, the TDM switching unit 34 and the voice processing unit 36. Thereafter, the converted data may be transmitted to the LAN access processing unit 32 of the user access processing module unit 33, or converted into the IP packet in the CPU 54 of the processor module unit 37. The IP packet is divided into ATM cells by applicable program resident in the process module unit 37, and transmitted to the PLD/PGA logic 55 for interfacing between the HPI bus and the UTOPIA bus.

The ATM cells transmitted to the PLD/PGA logic 55 are applied to the framer unit 42 of the frame conversion processing unit 38 of the WAN access processing module unit 41 through the UTOPIA bus, converted into xDSL frame supportable in the xDSL interface, transmitted to the encoder unit 43, converted into a signal usable in the xDSL physical access unit, transmitted to the physical access unit 39 according to an access type of a physical medium, and then transmitted to the corresponding system through the external xDSL network.

When receiving data, the xDSL network signal is received from the corresponding communication system, such as xDSL, through the physical access unit 39, passed through the decoding unit 45, converted into a signal usable in the access device 100, and transmitted to the deframer unit 44 of the frame conversion processing unit 38. The deframer unit 44 extracts the ATM cells useful in the system from the received xDSL frame, and transmits them to the PLD/PGA logic 55 of the processor module unit 37 of the central control processing module unit 40 through the UTOPIA bus.

The PLD/PGA logic 55 converts the ATM cells received through the UTOPIA bus, and transmits the converted cells to the CPU 54 through HPI bus. The CPU 54 re-combines the received ATM cells, removes a header data, extracts the available IP packet, and analyzes the IP packet to extract the compressed voice data, voice compression/restoring method and destination information. The CPU 54 transmits the compressed voice data to the voice processing unit 36 through the HPI bus, transmits control information to the voice processing unit 36 according to the voice compression/restoring method, and sets up a switching path of the TDM switching unit 34 according to the destination information. The voice processing unit 36 restores the voice compression data according to the control information of the CPU 54, and transmits the restored data to the TDM switching unit 34 through TDM bus C. The TDM switching unit 34 transmits the data to the analog/digital access processing unit 30,31 through the TDM bus A or B according to the switching path setup control information of the CPU 54, so that the user receives accessed service through, for example, xDSL network.

Moreover, if a routing protocol supporting the IP packet processing can be built in the CPU 54 of the processor module unit 37 with the IP packet having the voice data, the local network as well as the analog/digital voice access service can be embodied by using the LAN access processing unit of the user access processing unit, thus connecting to the external WAN network through the access device.

As discussed earlier, the access device of the present invention supports the variable data layer, minimizes hardware variations due to variations of a physical layer access medium, and utilizes system hardware according to environmental variations of the physical access unit.

The foregoing embodiments and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, mans-plus-function clauses are intended to cover the structure described herein as performing the recited function and not only structural equivalents but also equivalent structures.

What is claimed is:

1. An access device for supporting a variable data layer, the access device comprising:
   a user access processing module unit having an analog/digital access processing unit and a local area network access processing unit;
   a central control processing module unit connected to the user access processing module unit and having:
      a voice processing unit for compressing or restoring voice data to be processed in or inputted to the user access processing module unit;
      a time division multiplexing switching unit for performing voice data switching between the analog/digital access processing unit of the user access processing module unit and the voice processing unit; and
      a processor module unit for controlling the voice processing unit and the time division multiplexing switching unit, wherein the processor module further comprises:
         a CPU for forming the compressed voice signal, voice compression/restoring information and destination information as IP packets, when transmitting the voice signal to the 10 Base-T physical layer, extracting the compressed voice signal, voice compression/restoring information and destination information from the IP packet, when receiving the voice signal, dividing the IP packet into asynchronous transfer mode (ATM) cells for access to the second external network, or extracting the IP packet by re-combining the ATM cells;
         a memory for storing information processed by the CPU;
         a peripheral logic for defining an initial operation of the CPU; and
         a programmable logic device for performing interface between a Hewlett-Packard interface (HPI) bus and a universal test and operations physical interface for ATM (UTOPIA) bus; and
   a wide area network access processing module unit connected to the user access processing module unit and the central control processing module unit, the wide area network access processing module unit having:
   a frame conversion processing unit comprising
   a framer/deframer for transmitting/receiving ATM cells from the central control processing module unit through a first bus, and forming and extracting xDSL frames;
   an encoder/decoder unit for converting the xDSL frame into a signal usable in an external xDSL network, or the signal from the external xDSL network; and
   a physical access unit for performing physical layer access interface,
   wherein the analog/digital access processing unit is connected to the frame conversion processing unit via the HPI bus.

2. The access device of claim 1, wherein the central control processing module unit has a UTOPIA bus interface unit to communicate with the wide area network access processing module unit.

3. The access device of claim 1, wherein the first bus is the UTOPIA bus.

4. An access device for supporting a variable data layer including first and second external networks, the access device comprising:

a user access processing module unit connected to the first external network, wherein the user access processing module unit comprises: an analog access processing unit for processing an analog input data; a digital access processing unit for processing a digital input data; and a local area network access processing unit for communicating 10 Base-T physical layer data;

a wide area network access processing module unit connected to the user access processing module unit and the central control processing module unit, the wide area network access processing module unit communicating with the second external network and having:
  a frame conversion processing unit connected to the second external network for receiving therefrom a signal and transforming the signal into ATM cells useable by the central control processing module, and wherein the digital access processing unit is connected to the frame conversion processing unit via a HPI bus; and a central control processing module unit connected to the user access processing module unit for processing data received from the first external network, wherein the central control processing module unit is connected to the frame conversion processing unit via a UTOPIA bus, and wherein the central control processing module unit comprises:
  a time division multiplexing switching unit for switching TDM buses used to communicate with the analog access processing unit and the digital access processing unit, a voice signal processed in the user access processing module unit being transmitted through the TDM buses;
  a voice processing unit for compressing the voice signal to be transmitted to the second external network, and restoring a compressed voice signal from the second external network according to control information from the processor module unit; and
  a processor module unit having:
    a CPU for forming the compressed voice signal, voice compression/restoring information and destination information as IP packets, when transmitting the voice signal to the 10 Base-T physical layer, extracting the compressed voice signal, voice compression/restoring information and destination information from the IP packet, when receiving the voice signal, dividing the IP packet into asynchronous transfer mode (ATM) cells for access to the second external network, or extracting the IP packet by re-combining the ATM cells;
    a memory for storing information processed by the CPU;
    a peripheral logic for defining an initial operation of the CPU; and
    a programmable logic device for performing interface between a Hewlett-Packard interface (HPI) bus and a universal test and operations physical interface for ATM (UTOPIA) bus.

5. The access device of claim 4, the wide area network access processing module further comprising a physical access unit for performing physical layer access interface.

6. The access device of claim 4, the frame conversion processing unit further comprising a framer/deframer for transmitting/receiving the ATM cells from the central control processing module unit through a first bus, and forming and extracting xDSL frames; and an encoder/decoder unit for converting xDSL frames into the signal usable in the second external network, or the signal from the second external network.

7. The access device of claim 6, wherein the first bus is the UTOPIA bus.

8. The access device of claim 4, wherein the second external network is an xDSL network.

9. The access device of claim 4, wherein the central control processing module unit comprises:
  a voice processing unit for compressing or restoring voice data to be processed in or inputted to the user access processing module unit;
  a time division multiplexing switching unit for performing voice data switching between the analog access processing unit and the digital access processing unit of the user access processing module unit and the voice processing unit; and
  a processor module unit for controlling the voice processing unit and the time division multiplexing switching unit.

10. The access device of claim 4, wherein the analog access processing unit is connected to the time division multiplexing switching unit via the TDM bus.

11. The access device of claim 4, wherein the digital access processing unit is connected to the time division multiplexing switching unit via the TDM bus.

12. The access device of claim 4, wherein the frame conversion processing unit has
  a framer/deframer unit for converting the ATM cell received through the programmable logic device of the processor module unit and the UTOPIA bus into the xDSL frame, or converting the xDSL frame into the ATM cell; and
  an encoding/decoding unit for converting the xDSL frame.

13. The access device of claim 6, wherein the user access processing module unit comprises:
  an analog access processing unit for processing an analog input data;
  a digital access processing unit for processing a digital input data; and
  a local area network access processing unit for communicating 10 Base-T physical layer data.

14. The access device of claim 13, wherein the central control processing module unit comprises:
  a voice processing unit for compressing or restoring voice data to be processed in or inputted to the user access processing module unit;
  a time division multiplexing switching unit for performing voice data switching between the analog access processing unit and the digital access processing unit of the user access processing module unit and the voice processing unit; and
  a processor module unit for controlling the voice processing unit and the time division multiplexing switching unit.

* * * * *